United States Patent Office 3,502,767
Patented Mar. 24, 1970

3,502,767
METHOD OF MOLDING OF ARTICLES
Walter Morrison, Saint Helens, Henry Spencer, Maghull, and Allan Frank Mason, Orrell, near Wigan, England, assignors to Fibreglass Limited, Saint Helens, England, a British company
Filed Apr. 25, 1968, Ser. No. 723,988
Claims priority, application Great Britain, Apr. 25, 1967, 18,922/67
Int. Cl. B29g 5/00
U.S. Cl. 264—297                                4 Claims

ABSTRACT OF THE DISCLOSURE

This invention provides a method of moulding articles, particularly elongated articles, from fibrous material impregnated with heat curable material. In carrying out the method a layer of the impregnated material is arranged on a supporting platform having a temperature below the curing temperature of the impregnating material, the platform is then inserted into a moulding press, and the layer of material is discharged into the mould cavity after which the press is operated to deform the layer into the required form and the article is then cured while still within the mould cavity.

---

This invention relates to the moulding of fibrous material impregnated with a heat curable material and more particularly to the moulding of articles made from resin impregnated fibrous material, the latter being commonly known as fibrous mat.

It is known to manufacture such articles by placing a piece of fibrous mat between two heated mould parts, closing the mould parts to compress the fibrous mat to the desired density, and maintaining the fibrous mat in its compressed condition until heat transfer from the heated mould parts cures the resin to produce a fibrous mat retained in the mould form by the cured resin binder, hereinafter referred to as the "moulded articles."

In the known method of manufacture a difficulty is experienced in moulding articles having a length many times greater than the width for example, a length at least four times greater than the width because care must be taken to ensure that the fibrous mat is correctly located so as to fill the space between the moulding surfaces of the mould parts, hereinafter referred to as the "mould cavity," without undue stretching or compression, which may cause the finished article to be of nonuniform density, and as this careful location is, in practice, carried out on one of the heated mould parts precuring of the resin is often experienced and in such cases the finished article does not retain the desired moulded form. As the degree of precuring is dependent upon the time during which the resin in the fibrous mat is exposed to curing temperature before the mould parts are closed the use of multi-cavity moulds, requiring individual positioning of a number of fibrous mats, has been severely restricted and required highly skilled operatives.

An object of the present invention is to provide a method of and apparatus for moulding an article having a length many times greater than its width from fibrous material impregnated with heat curable material in which method undue risk of precuring of the resin is avoided.

In one preferred embodiment of the apparatus as suitable for making rigid pipe insulation the apparatus comprises a male mould part, female mould part and a frame.

According to a first aspect of the present invention there is provided a method of moulding an article from a fibrous material impregnated with heat curable material, comprising arranging at least one layer of said material in or on a supporting frame an element whose temperature is below the curing temperature of the impregnating material, introducing the element or frame into a moulding press, discharging the layer(s) from the element or frame into the mould cavity or cavities of the press, operating the press to deform the layer(s) into the required form, and heat curing the thus formed layer(s) whilst still within the mould cavity.

According to a further aspect of the invention there is provided apparatus for moulding articles from fibrous material impregnated with heat curable material, comprising a press having mould parts defining at least one mould cavity, at least one preloadable material feed means displaceable between a loading position and a discharge position and adapted to introduce at least one layer of material to be moulded into the press and means for heat curing the impregnating material in the press.

Preferably the element or frame is retained in its discharging position during a moulding operation, and the recharging of the press for the next following moulding operation is effected by using a further frame or element which has been charged during the first mentioned moulding operation and which remains in its discharging position during said following moulding operation, said first mentioned element or frame being recharged by material after its temperature is below said curing temperature.

In a particular arrangement the means for feeding the material to the press includes a frame having first and second end walls and a plurality of side by side walls interconnecting the end walls. The arrangement of the end walls and side by side walls is such that adjacent pairs of the side by side walls produce bottomless compartments into which the layers of material to be introduced into the mould parts of the press may be inserted.

With a view to facilitating the removal of the frame from the press during operation of the press one of the end walls is arranged to be readily removable from the remainder of the frame so that on removing this end wall from the frame the remainder of the frame can be withdrawn from the press.

The female mould part has a mould cavity of 3 ft. long with a semi-circular cross section of 1½" radius and the male mould part has a long protuberance having a semi-circular cross section of ½" radius flanked by two shoulders. When in a closed position the protuberance and the female mould cavity have their radii concentric and the shoulders close the mould cavity. The protuberance and the shoulders extend for the full length of the female mould cavity. The frame comprises two side wall members held in spaced parallel relationship by two end wall members so that said walls define a central opening having a length slightly in excess of the length of the male mould part and a width slightly greater than the width of the male mould part across the shoulders so that the male mould part can be entered into the opening, in the frame.

With the frame remote from the mould parts the central opening in the frame is carefully filled with a piece of fibrous mat and the mat in unstressed form has a width greater than the width of the opening so that said mat is retained in the frame by frictional contact with the side walls of the frame. The frame is then displaced into the space between the two mould parts and located on the female mould so as to allow the male mould to enter the frame opening. The male mould part is lowered towards the female mould and enters into the opening in the frame to contact the fibrous mat and push the fibrous mat downwardly out of the opening in the frame and into the female mould cavity. The movement of the male mould part is continued until the fibrous mat is pushed clear of the frame and the fibrous mat is compressed in the mould cavity with the radius of curvature of the female cavity section and the protuberance section concentric so that the mould cavity comprises half an annulus. Immediately the mould parts attain a closed position the leading end wall of the frame is removed, the frame is withdrawn from the closed mould parts and the end wall is refitted at the loading position to allow a new piece of fibrous mat to be located in the frame opening.

The mould parts include heating means which maintain said parts at elevated temperatures so that in a closed position the fibrous mat in the mould cavity is heated and the resin binder is cured.

When the mould parts have been closed for sufficient period of time to ensure curing of the resin the mould parts are opened, the moulded articles are removed, and the frame is moved into the space between the mould parts to locate the next charge for the mould parts.

The invention will now be described further by way of example with reference to the accompanying drawings, in which.

Figure 1:
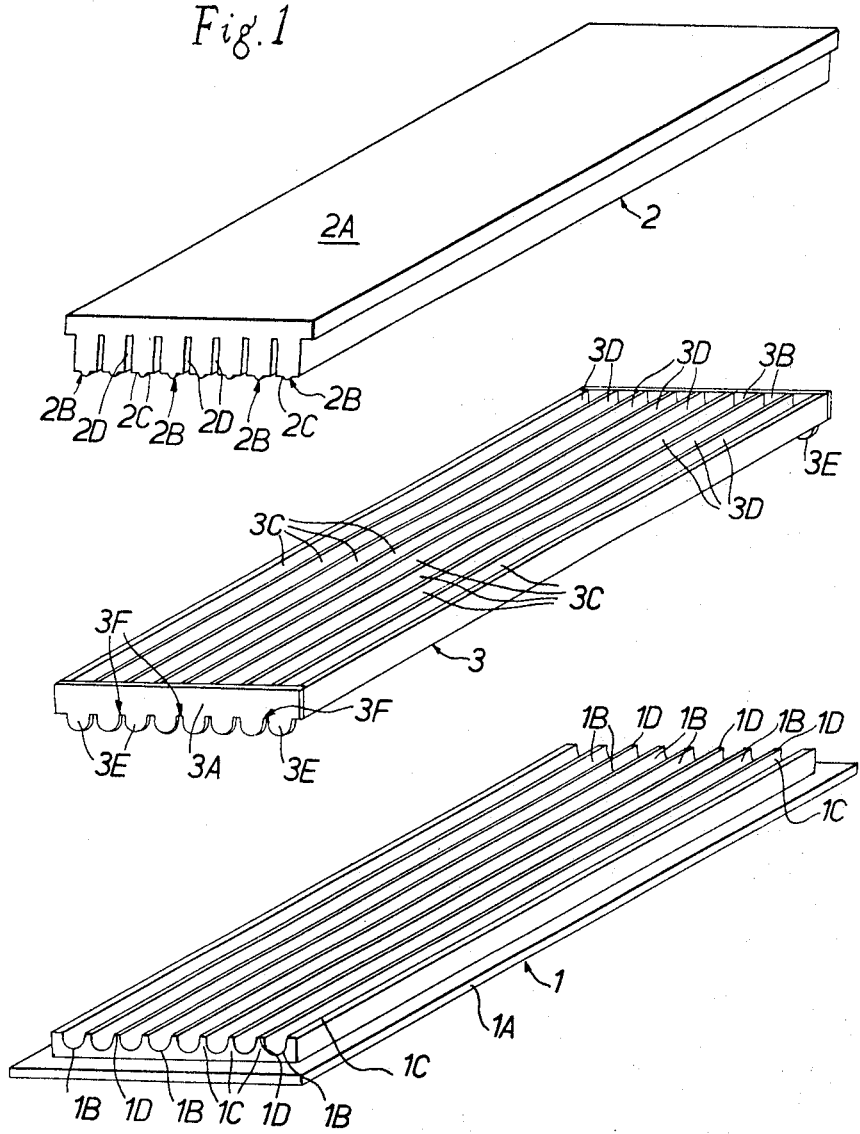
FIGURE 1 is a perspective exploded view of material moulding apparatus, the figure showing a male mould part at the top, with a supporting or loading frame below it, and a female mould part below the frame.

The apparatus illustrated is for moulding half-sections for tube insulators and is adapted to produce eight such sections simultaneously. The apparatus includes a female mould part 1, a male mould part 2 and a supporting or loading frame 3 for material to be introduced into the mould parts. The female mould part 1 has a base 1A and eight elongated depressions or mould surfaces 1B, each of generally semi-circular cross-section, bounded by upstanding wall parts 1C having flat upper surfaces 1D.

The male mould part 2 has a base 2A with eight downwardly projecting elongated ribs presenting mould surfaces 2B, each of generally semi-circular cross-section and flanked on each side by flat shoulders 2C the surfaces being of smaller radius than the radius of the complementing surfaces 1B of the mould part 1. Slot-like depressions 2B extending to the base 2A are formed in the male mould part 2 between adjacent ribs 2B.

The supporting or loading frame 3 has end walls 3A, 3B interconnected by nine elongated walls 3C thus forming eight elongated rectangular compartments 3D. The lower edge of each end wall 3A and 3B is formed with eight semi-circular projections 3E, the radius of each of which is such that the eight projections 3E at each end of the frame fit into corresponding end portions of the mould surfaces 1B. These projections 3E are separated by short flat-surfaces 3F which are co-operable with the surfaces 1D so that the frame 3 can sit or nest on the top surface of the female mould 1. Openings 5 are provided in the mould parts 1 and 2 (the openings being located in the surfaces 1B, 2B and 2C see FIGURE 3) to enable the circulation of air through the mould cavities formed by the surfaces 1B and 2B.

The method of operation of the apparatus as so far described will now be explained.

Eight elongated strips 4 of material to be moulded are pushed down into the eight compartments 3D of the frame 3. Preferably the strips 4 are cut from glass fibre mat impregnated with thermosetting resin, such as a phenol formaldehyde resin. The length of each strip 4 of fibrous mat is a little less than the compartment length, so that the strips 4 can be carefully located without longitudinal compression. The width of each strip 4 is rather greater than the compartment width, so that when the strips are pushed down into the compartments they assume the shape shown in FIGURE 2. This deformation of the strips 4 enables them to be retained in the compartments in the frame 3 by friction against the side walls 3C. This loading of the frame 3 takes place at a location away from that shown in FIGURE 1.

Figure 2:
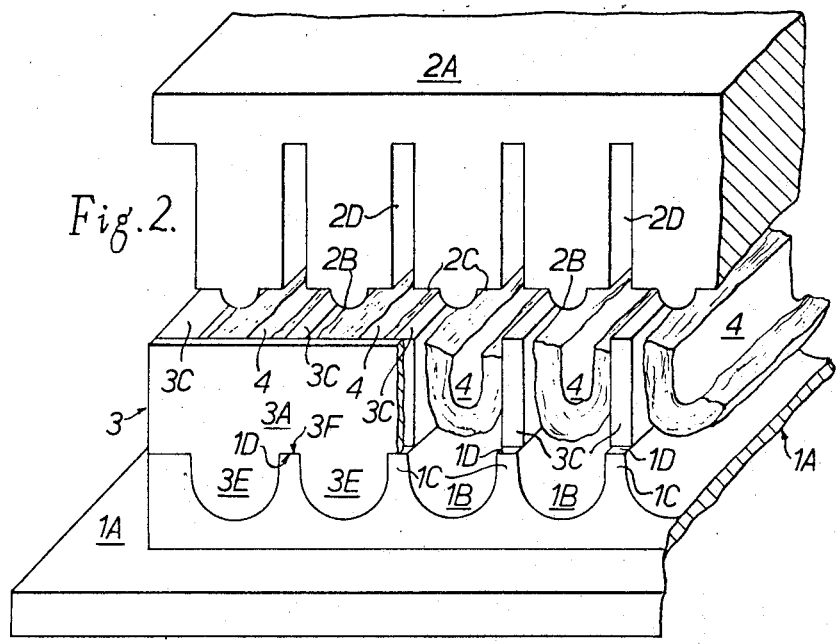
FIGURE 2 is a part sectional perspective view of the apparatus of FIGURE 1, to an enlarged scale and showing one stage of operation of the apparatus.

The loaded frame 3 is now moved into a position between the mould parts 1 and 2, as is shown in FIGURE 2, with the frame 3 resting on the female mould part 1. The correspondence of the parts 1B, 3E and 1D, 3F will be seen.

Figure 3:
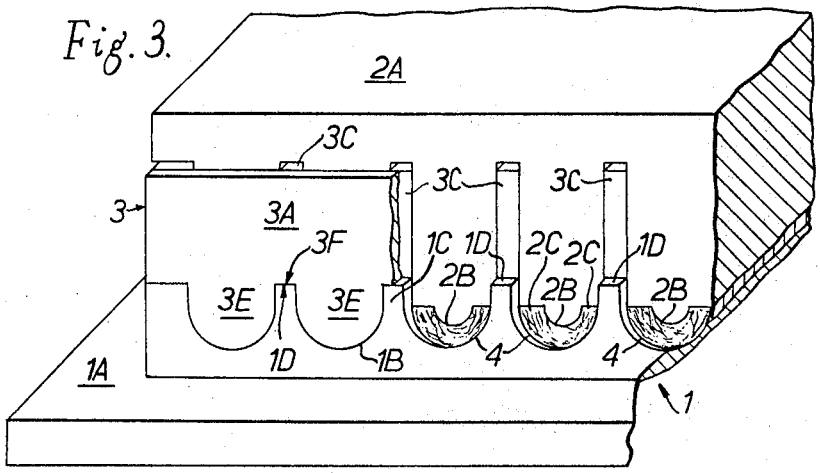
FIGURE 3 is a figure similar to FIGURE 2, but showing a later stage of operation of the apparatus.

The male mould part 2 is now moved down until it reaches the position shown in FIGURE 3. During this movement the ribs 2B enter the compartments 3D of the frame 3, engage the supported strips 4, push said strips 4 down into engagement with the female mould surfaces 1B, and compress said strips 4 in the mould cavities defined by the surfaces 1B, 2B and 2C.

The strips 4, which are now compressed within the arcuate mould cavities, are now heated by the mould parts 1 and 2 to cure the resin so that the strips 4 will retain the moulded form. The mould parts 1 and 2 are heated by circulation of hot air therethrough and the curing of the resin is assisted by releasing hot air into the mould cavity through the openings 5 in the mould surfaces 1B, 2B and 2C.

When the strips 4 are cured to the required form, that is, into lengths of rigid material of curved cross-section, the male mould part 2 is raised, and then the frame 3 is removed. The latter being moved away laterally. The cured articles are then removed.

With the arrangement described above the frame is retained in relationship with the mould parts 1 and 2 throughout the whole of the moulding operation and thus becomes heated during the curing. Consequently the extracted frame must be allowed to cool to a temperature below that at which curing of the resin is initiated before the frame can be recharged with raw material. By using a number of interchangeable frames it is readily possible that whilst one frame is positioned between the mould parts 1 and 2 during a moulding operation, a second frame is being charged with fibrous mat and at least one other frame is being cooled. In this way a cooled new frame charged with raw materials is always ready for introduction between the mould parts 1 and 2 so that it is not necessary to wait for frame cooling to take place before recharging the mould parts, whereby the recharging time is substantially reduced to a small percentage of the press cycle time.

Further, as the changeover time is reduced it has been found that heat losses from the mould parts during changeover is also reduced so that less heat is lost during changeover and the temperatures of the mould parts can be more readily maintained so that the actual curing time is reduced.

Figure 4:
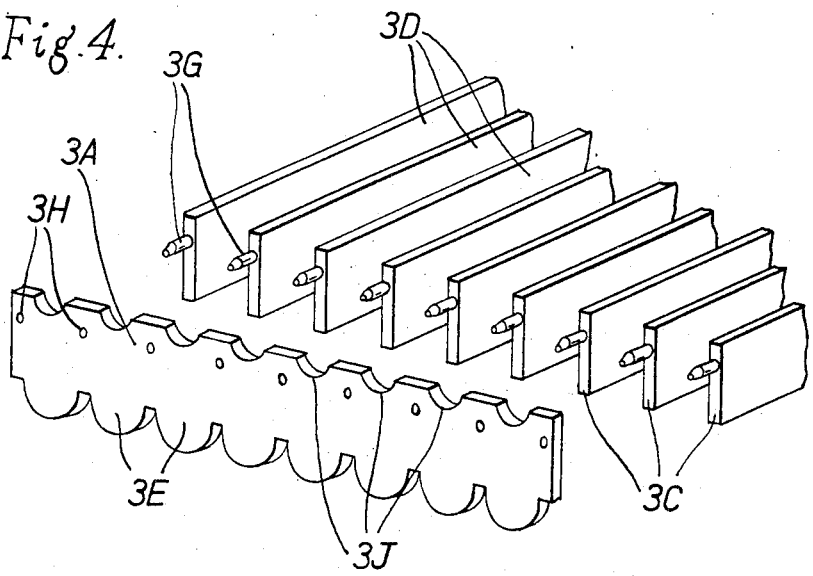
FIGURE 4 is an exploded perspective view of a modified detail of the apparatus of FIGURES 1 to 3.

FIGURE 4 shows an alternative frame construction wherein the end wall 3A is detachable. To attain the detachability each wall 3C has a peg 3G engageable in a hole 3H in the end wall 3A so that end wall 3A, when fitted, retains the walls 3C in the desired relationship and permits the strips 4 to be located in the frame compartments and permits the frame to be introduced between the mould parts 1 and 2 in the manner described with reference to the frame 3 in FIGURES 1, 2 and 3.

Once the mould parts 1 and 2 are closed onto the strips 4 the end wall 3A is removed from the pegs 3G and the frame 3 is slidably withdrawn from the mould parts 1 and 2 before the frame 3 becomes heated thereby. The end wall 3A is then reassembled on the frame and the frame 3 can be recharged with strips 4 whilst the mould is curing the previously charged strips 4.

The frame construction illustrated in FIGURE 4 allows the moulding apparatus to operate with a single frame for each set of mould parts 1 and 2, and as the frame is maintained between the mould parts 1 and 2 only until the said parts 1 and 2 are closed the frame is not excessively heated by the moulding apparatus so that the strips 4 can be introduced into the reassembled frame without undue risk of precuring of the reinous material.

Since the ribs 2B of the male mould 2 must enter the female mould cavities between upstanding wall parts 1C, the ribs 2B are made narrower than the upper open ends of the female cavities thereby to allow mechanical clearance between the mould parts. Because of this clearance, in practice, some part of the strip 4 "flows" into the clearance spaces between parts 2B and 1B to form "flashes" on the moulded articles. It has been found in practice that because of the irregular slope of the surfaces presented by the male mould part to the moulded article and the "flashes" formed thereon some of the moulded articles move freely out of the female mould cavities and are retained on the male mould members when the mould parts 1 and 2 are opened.

To facilitate ejection of the moulded articles from the mould parts the end wall 3A is shaped to conform with the "day light" section between the open mould parts 1 and 2 so that the curved lower regions 3E of the frame may be utilized to sweep the female cavities clear of the articles. Furthermore as the recesses 31, conforming to the mould surfaces 2B and 2C of the male mould, sweep articles from the male mould 2 as the frame 3 is advanced into the space between the two mould parts 1 and 2 along a path parallel with the longitudinal axis of the mould cavities.

Thus with this arrangement the frame 3 may be arranged to eject the moulded articles from the mould parts 1 and 2 as said frame is moved into the location in which it prevents fresh strips 4 for moulding and this additional action by the frame once again serves to reduce the idle time of the mould parts 1 and 2.

In an alternative method of utilizing the frame to eject moulded articles the moulded articles are still retained in the female mould cavities so that the scalloped lower edge of the frame rejects the articles.

Figure 5:
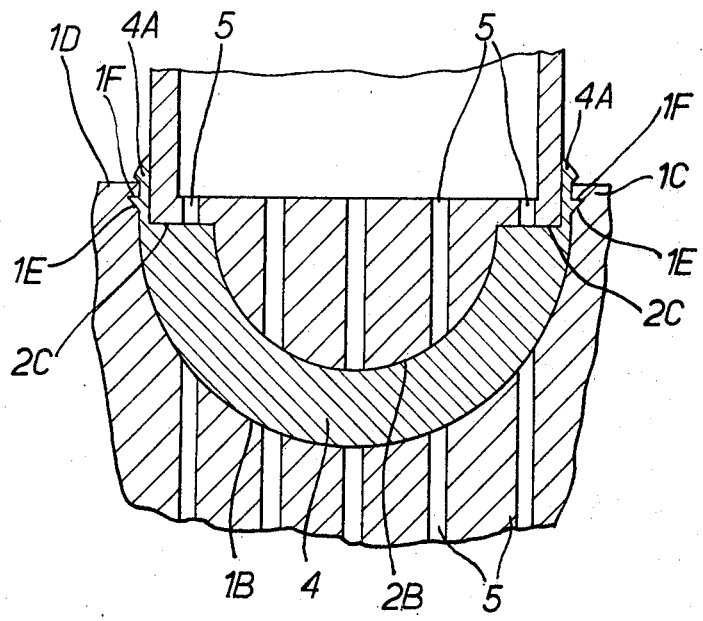
FIGURE 5 is a detail section to an enlarged scale, the section being through a mould cavity of the apparatus of FIGURE 1 to 4.

FIGURE 5 shows one method of retaining the moulded articles in the female mould and it will be seen that a recess 1E is cut in each side of the cavity wall just above the axis of radius of the curved mould surface 1B so as not to interfere with the final form of the article. Each recess 1E runs the whole length of the cavity and the recesses are shaped to present a substantially horizontal downwardly facing surface 1F.

With recesses 1E compression of each strip 4 by closure of the mould parts 1 and 2 causes part of the strip material to flow between the mould parts 1 and 2 to form a flash 4 running along each side of the compressed body and part of the flash is forced or expanded into the recess 1E so that when the article is cured and the mould parts 1 and 2 are drawn apart the cured part of the flash within the cavity 1E abuts the surface 1F and prevents the moulded article from being retracted with the mould part 2.

When the mould parts 1 and 2 are elevated frame 3 is advanced and the articles 4 are pushed longitudinally out of the female mould.

After moulding the articles are trimmed to length and the flash is removed in known manner.

In a modified arrangement one of the end walls of the frame is replaced by a number of hinged doors. Each door is so hinged to the adjacent and of a side wall that when all of the doors are closed they constitute an end wall and that when the doors are opened they can extend in prolongation of the side walls. With this arrangement when the doors are open the frame can be readily withdrawn from the press. If desired the doors can be resiliently loaded so that they automatically retain to their closed positions after removal of the frame from the press.

What we claim is:

1. A method of moulding articles from mats of fibrous material impregnated with an initially uncured, heat curable material, said method comprising:
   arranging a plurality of said mats in side-by-side relationship on a support frame;
   maintaining the temperature of said frame below the curing temperature of said heat curable material while the mats are on the frame;
   aligning said frame and the mats thereon with corresponding mould cavities for the mats;
   pushing the mats through the frame and pressing the same into corresponding cavities to cause the mats to assume the desired form; and thereafter
   increasing the temperature of the mats in the cavities to a level above said curing temperature whereby to affect curing of said mats.

2. A method as set forth in claim 1 wherein is included the step of removing the frame from said mould cavities prior to curing of the mats.

3. A method as set forth in claim 2 wherein is included the step of recharging the frame with mats to be moulded during completion of the curing of the initial set of mats.

4. A method as set forth in claim 1 wherein is included the step of arranging a second plurality of said mats on a second support frame during the initial moulding operation, and repeating said maintaining, aligning, pushing and increasing steps with said second plurality of mats after the completion of said initial moulding operation.

References Cited

UNITED STATES PATENTS

| 682,243 | 9/1901 | Cuscaden et al. | 25—103 |
| 1,597,803 | 8/1926 | Kearney et al. | |
| 1,982,576 | 11/1934 | Derry. | |
| 2,312,215 | 2/1943 | Howie. | |
| 2,481,670 | 9/1949 | Japikse. | |
| 2,639,464 | 5/1953 | Green et al. | 264—297 |
| 2,877,498 | 3/1959 | Schneider | 264—137 |
| 3,058,154 | 10/1962 | Howard et al. | 264—297 X |

FOREIGN PATENTS 456,355  5/1949  Canada.

ROBERT F. WHITE, Primary Examiner

N. RUSHEFSKY, Assistant Examiner

U.S. Cl. X.R.

18—16, 30; 25—103; 264—324